(12) United States Patent
Bengtsson et al.

(10) Patent No.: US 12,739,776 B2
(45) Date of Patent: Sep. 15, 2026

(54) METHODS AND DEVICES FOR POSITIONING OF A USER EQUIPMENT IN A WIRELESS NETWORK

(71) Applicant: Sony Group Corporation, Tokyo (JP)

(72) Inventors: Erik Bengtsson, Eslöv (SE); José Flordelis, Lund (SE); Kun Zhao, Malmö (SE); Johan Hill, Lund (SE); Anders Berggren, Lund (SE); Basuki Priyanto, Eslöv (SE); Fredrik Rusek, Eslöv (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 477 days.

(21) Appl. No.: 18/029,604

(22) PCT Filed: Sep. 29, 2021

(86) PCT No.: PCT/EP2021/076869

§ 371 (c)(1),
(2) Date: Mar. 30, 2023

(87) PCT Pub. No.: WO2022/078763

PCT Pub. Date: Apr. 21, 2022

(65) Prior Publication Data

US 2023/0413217 A1 Dec. 21, 2023

(30) Foreign Application Priority Data

Oct. 15, 2020 (SE) .................................... 2051199-4

(51) Int. Cl.
*H04W 64/00* (2009.01)
*H04W 68/00* (2009.01)

(52) U.S. Cl.
CPC ........... *H04W 64/00* (2013.01); *H04W 68/00* (2013.01)

(58) Field of Classification Search
None
See application file for complete search history.

(56) References Cited

U.S. PATENT DOCUMENTS

2019/0182794 A1 6/2019 Wong
2019/0373573 A1 12/2019 Cui
(Continued)

FOREIGN PATENT DOCUMENTS

CN 101106801 A 1/2008
CN 105453653 A 3/2016
(Continued)

OTHER PUBLICATIONS

Xiaomi, "Positioning enhancements for RRC Idle and RRC Inactive State UE," 3GPP TSG RAN WG2 #111, R2-2007173, Aug. 17-28, 2020, 4 pages.
(Continued)

*Primary Examiner* — Suhail Khan
(74) *Attorney, Agent, or Firm* — Tucker Ellis LLP

(57) ABSTRACT

Devices and methods for facilitating positioning of a user equipment, UE (10), while the UE remains unconnected to a wireless network. In one aspect, a method performed by the UE is provided, comprising: receiving (S510), from the wireless network (100), a first message (81,84) associated with paging of the UE, wherein said first message identifies a positioning request to transmit uplink positioning signals; transmitting (S540), after expiry of a predetermined first time limit (T1), uplink positioning signals for reception in the wireless network.

20 Claims, 8 Drawing Sheets

(56) References Cited

U.S. PATENT DOCUMENTS

| | | | | |
|---|---|---|---|---|
| 2021/0050978 | A1* | 2/2021 | Manolakos | H04L 5/0051 |
| 2021/0400734 | A1* | 12/2021 | Zhang | H04B 17/103 |
| 2022/0167301 | A1* | 5/2022 | Goyal | G01S 5/0236 |
| 2023/0422202 | A1* | 12/2023 | Manolakos | H04W 64/00 |

FOREIGN PATENT DOCUMENTS

| | | | |
|---|---|---|---|
| CN | 111149415 | A | 5/2020 |
| WO | 2018028925 | A1 | 2/2018 |
| WO | 2020146739 | A1 | 7/2020 |
| WO | 2020168573 | A1 | 8/2020 |
| WO | 2020197829 | A1 | 10/2020 |
| WO | 2020198269 | A1 | 10/2020 |

OTHER PUBLICATIONS

Swedish Search Report from corresponding Swedish Application No. 2051199-4, mailed on Jun. 1, 2021, 3 pages.
International Search Report from corresponding International Application No. PCT/EP2021/076869, mailed on Jan. 4, 2022, 3 pages.

* cited by examiner

Target

Server

1. ProvideLocationInformation

2. ProvideLocationInformation

METHODS AND DEVICES FOR POSITIONING OF A USER EQUIPMENT IN A WIRELESS NETWORK

FIELD OF THE INVENTION

The technology of the present disclosure relates generally to operations of a network node and of a user equipment acting as wireless communications device in a wireless communications network. Specifically, solutions are proposed for positioning which are usable when the user equipment is in an unconnected state with respect to the wireless network.

BACKGROUND

In existing wireless communications systems (e.g., 3G or 4G-based systems), estimations of a device position are generally considered acceptable when regulatory positioning requirements are satisfied. For example, for emergency calls, a position estimate is only required to be accurate within 50 meters in 4G systems. Positioning is an important feature under consideration of the Third Generation Partnership Project (3 GPP) for 5G systems such as New Radio (NR). The specification is targeting use cases beyond emergency call services (i.e. regulatory requirements), such as commercial use-cases and 5G systems may be expected to provide sub-meter positioning accuracy.

Cellular-based positioning may be downlink (DL) based or uplink (UL) based. In legacy systems, timing measurements and angle measurements are common techniques in downlink-based positioning. For instance, observed time difference of arrival (OTDOA) is a multilateration technique in 4G systems. In this technique, a base station (eNB) transmits positioning reference signals (PRS). A user equipment (UE) estimates time of arrival (TOA) based on the received PRS. The TOA measured from the PRS of multiple base stations are subtracted from a TOA corresponding to a reference base station to generate OTDOA measurements. The UE reports the OTDOA measurements or measured time difference (e.g. Reference Signal Time Difference (RSTD)) to a location server. The location server estimates the position of the UE based on the RSTD report and known coordinates of the base stations. Another technique, such as Enhanced cell ID with LTE systems, involves a base station estimating an angle of arrival (AoA) of a signal transmitted by the UE. The base station exploits phase difference from at least two receive antennas to estimate the AoA, for example.

One approach in legacy systems for uplink-based positioning is uplink time difference of arrival (UTDOA). With this approach, a user equipment (UE) transmits a reference signal, which is received by one or more base stations or dedicated location measurement units (LMUs). The base stations or LMUs estimate a time of arrival and report in a form of positioning measurement to a location server to estimate the UE's position, e.g. via multilateration if multiple base stations measure a time of arrival.

With legacy systems, radio access technology (RAT) dependent positioning (e.g. uplink-based or downlink-based positioning) may be performed when a UE is in connected mode. In legacy systems, the use-case for RAT dependent positioning is typically limited to positioning to support emergency calling and, as such, the UE would already be in connected mode for the emergency call. In 5G NR systems, use-cases for positioning may not be limited to emergency call support and may include commercial use-cases. In addition, 5G use-cases may demand various parameters for positioning results (e.g. vertical positioning, horizontal positioning, mobility, and/or latency) and various accuracy requirements (e.g. within hundreds of meters, within tens of meters, or sub-meter). These use-cases may not otherwise require the UE to be in connected mode as with emergency calls. In such situations, positioning that is dependent on being in connected mode may cause long latency in getting a position of the UE, incur additional signaling overhead, and increase UE power consumption due to signaling between the UE and a network node to enter and maintain connected mode. While RAT independent techniques (e.g. GPS or other sensors) may be utilized by the UE for positioning, reporting a position acquired with these techniques to the network may still depend on being in connected mode.

WO2020/198269 discloses an approach that supports positioning of a UE while the UE is in idle mode. The network provides UL resource configuration for positioning signals when the UE is still in connected mode. The positioning configuration may indicate positioning resources usable by the UE while in idle mode.

Various drawbacks are associated with legacy RAT dependent UE positioning. For one thing, it takes a long time and much signaling to get a UE position or UE positioning measurement results since first the UE needs to get connected.

SUMMARY

Solutions outlined herein provide various improvements to the field of positioning based on uplink transmission of positioning signals. The invention is defined by the terms of the claims.

According to one aspect of the disclosure, a method is provided for facilitating positioning of a UE, performed by the UE while being unconnected to a wireless network, wherein the method comprises:

- receiving, from the wireless network, a first message associated with paging of the UE, wherein said first message identifies a positioning request;
- transmitting, after expiry of a predetermined first time limit, uplink positioning signals for reception in the wireless network.

By means of this method, positioning based on UL positioning signals may be both initiated and carried out without the UE having to assume connected mode with respect to the wireless network.

According to another aspect, a UE configured to implement the suggested method is provided.

According to another aspect, a method is provided for facilitating positioning of a UE, performed in a network node of wireless network while the UE is unconnected, wherein the method comprises:

- transmitting a first message associated with paging of the UE, wherein said first message identifies a positioning request;
- receiving, after expiry of a predetermined first time limit, uplink positioning signals transmitted from the UE.

According to another aspect, a network node configured to implement the suggested method is provided.

DETAILED DESCRIPTION

Figure 1:
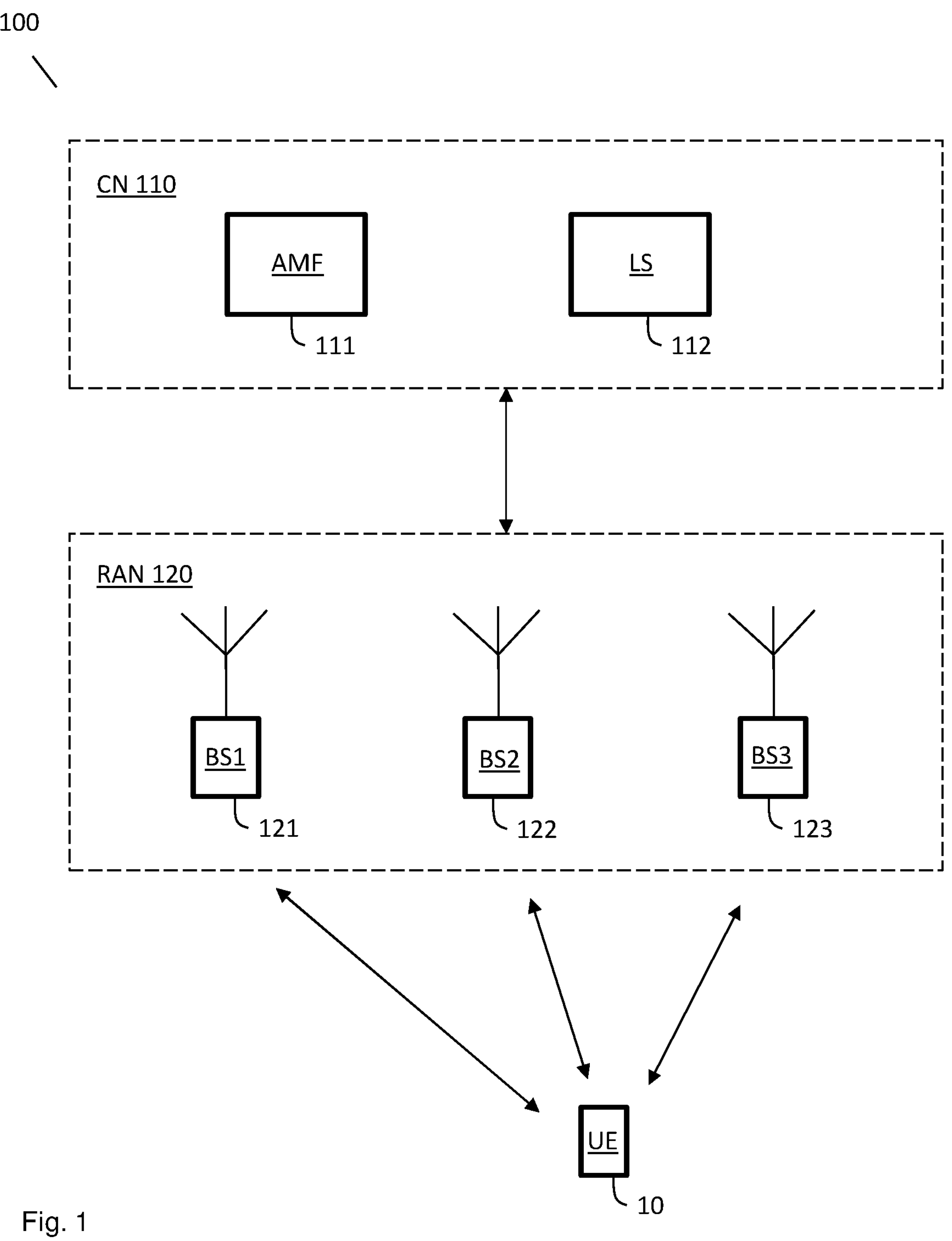
FIG. 1 is a schematic representation of a wireless network and a UE capable of communicating with the network.

In the following description, for purposes of explanation and not limitation, details are set forth herein related to various examples. However, it will be apparent to those skilled in the art that the present invention may be practiced in other examples that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically illustrates a wireless communication scenario, providing an example of a scene in which the solutions provided herein may be incorporated for positioning of a UE 10.

A wireless network 100 may comprise a core network (CN) 110 and one or more access networks 120, such as a Radio Access Network (RAN). The wireless network may be configured according to at least some of the specifications as used by the 3GPP technical standard. The core network may e.g. be a 4G EPC or a 5G Core. The core network 110 may further be connected to other communication systems such as the Internet. A network node operating as a location server (LS) 112 may be connected in the core network 110. The CN 110 may further comprise a core access and mobility management function (AMF) 111, as illustrated. As known from legacy systems, the CN 110 may comprise further functions and network nodes, which are left out here for the sake of simplicity.

The access network 120 is connected to the core network 110 and is usable for communication with UEs, such as the illustrated UE 10. The access network 120 may comprise a plurality of access nodes or base stations 121-123, configured to provide a wireless interface for, inter alia, the UE 10. In a 5G network, an access node 121-123 is typically referred to as a gNB, and this term will occasionally be referred to herein as well. The base stations 121-123 may be stationary or mobile. The actual point of transmission and reception of each base station may be referred to as a Transmission and Reception Point (TRP), which may coincide with an antenna system of the respective base station.

The UE 10 may be any device operable to wirelessly communicate with the network 100 through the base stations 121-123, such as a mobile telephone, computer, tablet, a machine to machine (M2M) device, an IoT (Internet of Things) device or other.

Figure 2:
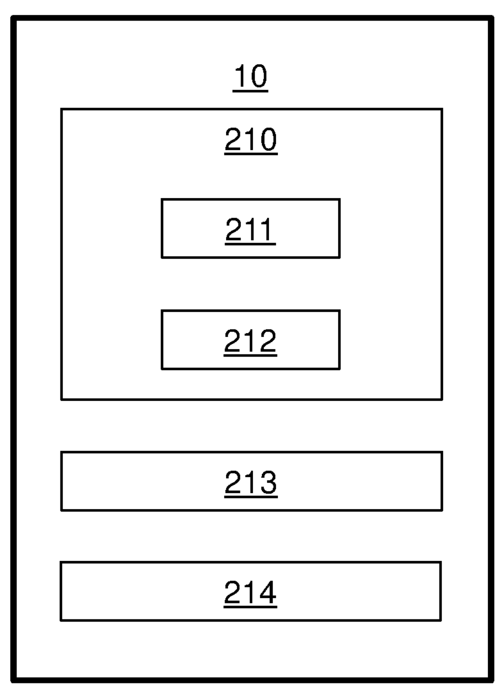
FIG. 2 is a schematic block diagram of the UE from the network environment.

Before discussing various process solutions for the proposed method, the UE 10 and an exemplary access node 121 will be functionally discussed on a general level. FIG. 2 schematically illustrates an example of the UE 10 for use in a wireless network 100 as presented herein, and for carrying out the method steps as outlined. The UE 10 may be a New Radio (NR) UE in which the UE is connected to a 5G NR cellular system 120.

The UE 10 comprises a radio transceiver 213 for communicating with other entities of the radio communication network 100, such as the base stations 121-123 in various frequency bands. The transceiver 213 may thus include a radio receiver and transmitter for communicating through at least an air interface.

The UE 10 further comprises logic 210 configured to communicate data, via the radio transceiver, on a radio channel, to the wireless communication network 100 and possibly directly with another terminal by Device-to Device (D2D) communication.

The logic 210 may include a processing device 211, including one or multiple processors, microprocessors, data processors, co-processors, and/or some other type of component that interprets and/or executes instructions and/or data. The processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage media. For example, the memory storage 212 may include a random access memory (RAM), a dynamic random access memory (DRAM), a cache, a read only memory (ROM), a programmable read only memory (PROM), flash memory, and/or some other type of memory. The memory storage 212 may include a hard disk (e.g., a magnetic disk, an optical disk, a magneto-optic disk, a solid state disk, etc.).

The memory storage 212 is configured for holding instructions in the form of computer program code, which may be executed by the processing device 211, wherein the logic 210 is configured to control the UE 10 to carry out any of the method steps as provided herein. Software defined by said computer program code may include an application or a program that provides a function and/or a process. The software may include device firmware, an operating system (OS), or a variety of applications that may execute in the logic 210.

The UE 10 may further comprise an antenna system 214, connected to the transceiver 213, which may include one or more antenna arrays. In various examples the antenna system 214 comprises different antenna elements configured to communicate with at least the access network 120.

Obviously, the UE 10 may include other features and elements than those shown in the drawing or described herein, such as a power supply, a casing, a user interface, sensors, etc., but these are left out for the sake of simplicity.

Figure 3:
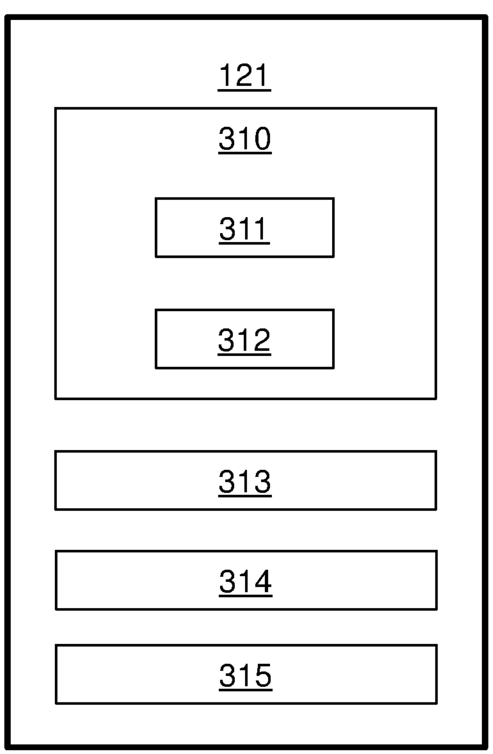
FIG. 3 is a schematic block diagram of a radio access network (RAN) node from the network environment.

FIG. 3 schematically illustrates an example of a base station 121 for use in a radio communication network 100 as presented herein, and for carrying out the method steps as outlined herein.

The base station 121 comprises one or more radio transceiver(s) 313 for wireless communication with other entities of the radio communication network 100, such as the UE 10. The transceiver 313 may thus include a radio receiver and transmitter for communicating through at least an air interface.

The base station 121 further comprises logic 310 configured to communicate data, via the radio transceiver(s), on a radio channel, with UE 10. The logic 310 may include a processing device 311, including one or multiple processors, microprocessors, data processors, co-processors, and/or some other type of component that interprets and/or executes instructions and/or data. The processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the base station 121 to carry out any of the method steps as provided herein. Software defined by said computer program code may include an application or a program that provides a function and/or a process. The software may include device firmware, an operating system (OS), or a variety of applications that may execute in the logic 310.

The base station 121 may further comprise or be connected to an antenna 314, connected to the radio transceiver 313.

The base station 121 may further comprise one or more communication interfaces 315 for communication with core network nodes, such with the AMF 111 and LS 112.

Referring back to FIG. 1, the UE 10 and the wireless network 100 may be arranged in different modes or states of connection. A radio link may be established between the UE 10 and one of the access nodes 121 for providing wireless radio services to the UE in connected mode, also referred to as RRC_CONNECTED. The access node 121 to which the radio link is established will be referred to as the serving access node 121 or serving base station. The UE 10 may further operate in a state where it is unconnected to the wireless network 100 in order to preserve UE power consumption. This may be the case when the UE 10 is in an idle (RRC_IDLE) or inactive state between cycles of communication in discontinuous reception and transmission, DRX. When the UE 10 is unconnected there is no data communication channel active between the UE 10 and the access network 120. The UE 10 may further be released from the access network 120 while a connection associated with the UE 10 is maintained between the access network 120 and the core network 110, an unconnected state which may be referred to as RRC_INACTIVE.

Figures 4A, 4B:
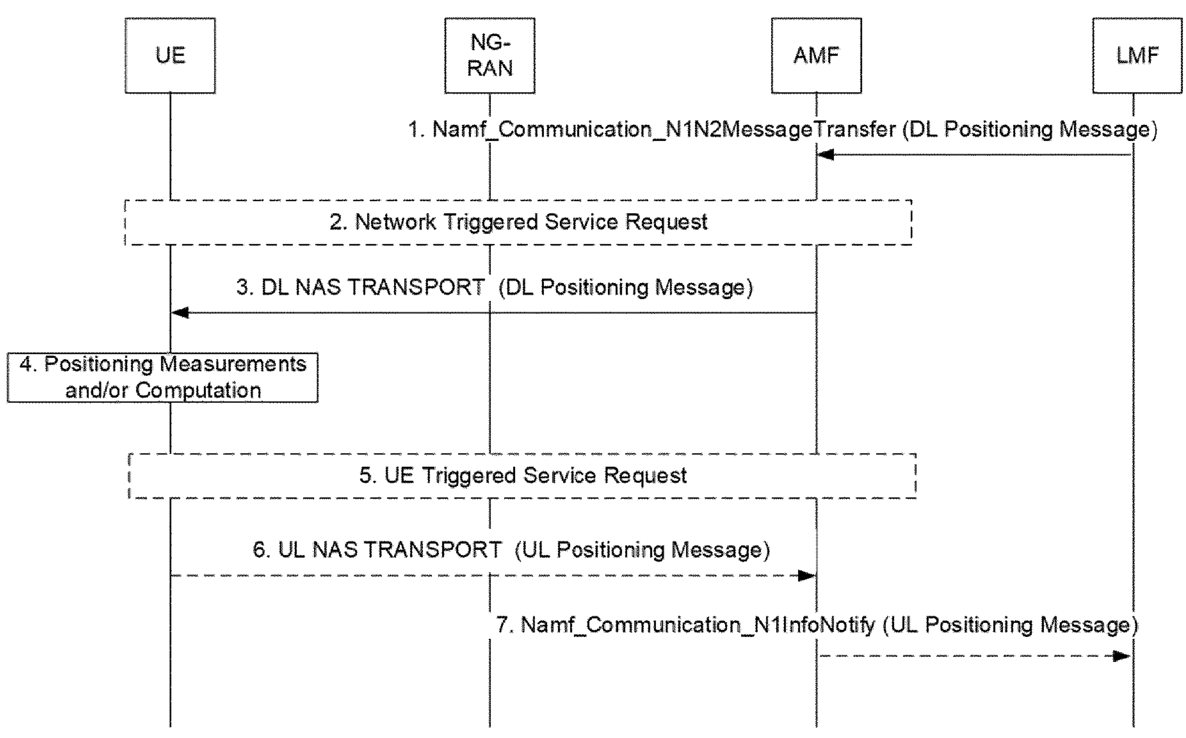
FIGS. 4A and 4B provide examples of signal and message communication in legacy positioning.

FIG. 4A schematically presents the procedure for legacy UE-assisted positioning as specified in 3GPP technical specification TS 23.273 v16.4 under paragraph 6.11.1. The figure illustrates a high-level signaling. The main steps involved are the following:

1. The Location Server (LMF) triggers a location request.
2. The network triggers a Mobile terminated Service Request.
3. The UE is paged, performs RACH and subsequently enters the RRC_CONNECTED and CM CONNECTED states.
   a. The AMF sends a non-access stratum (NAS) message to the UE to perform positioning measurements, or
   b. The AMF sends a positioning message to the radio access network (RAN) serving the UE, wherefore the corresponding RAN node configures the UE via RRC.
4. The UE performs positioning measurements.

6. UE sends the obtained positioning measurements to the location server using the LPP protocol via the AMF in a NAS message. In future releases the LPP protocol may be sent over the user plane. The LPP protocol is specified in TS 37.355 v16.1.

Specifically, as provided in FIG. 4B, the UE can provide the obtained positioning measurements to the location server (LMF) using a location information delivery procedure, as outlined in clause 5.3.2. of said technical specification.

A problem associated with the legacy positioning procedures is that it takes a long time and much signaling to get a UE position or UE positioning measurement results since first the UE needs to get connected, and then it will have to be configured to perform the radio measurements. Furthermore, if operating in FR2 bands, the UE also needs to acquire a suitable beam-pair, for data transmissions to the serving base station 121 and to neighboring base stations 122, 123, which further adds to the already long latency and extensive signaling.

The solutions proposed herein involve a method, and devices to carry out the methods, for the network 100 to trigger the UE 10 to perform positioning by transmitting, to the network, uplink positioning signals. Herein, positioning signals for use in UL positioning may be positioning reference signals, e.g. Sounding Reference Signal (SRS) in the example of a NR implementation. It shall be noted, though, that where the term SRS is used herein, it is to be regarded as an example to which the general solutions relating to UL positioning signals are not restricted. The network 100 provides the UE 10 with the necessary SRS configuration with minimum signaling and low latency. Various examples further make use of an identified limited number of UL beam resources, while maintaining minimum signaling.

Figure 5:
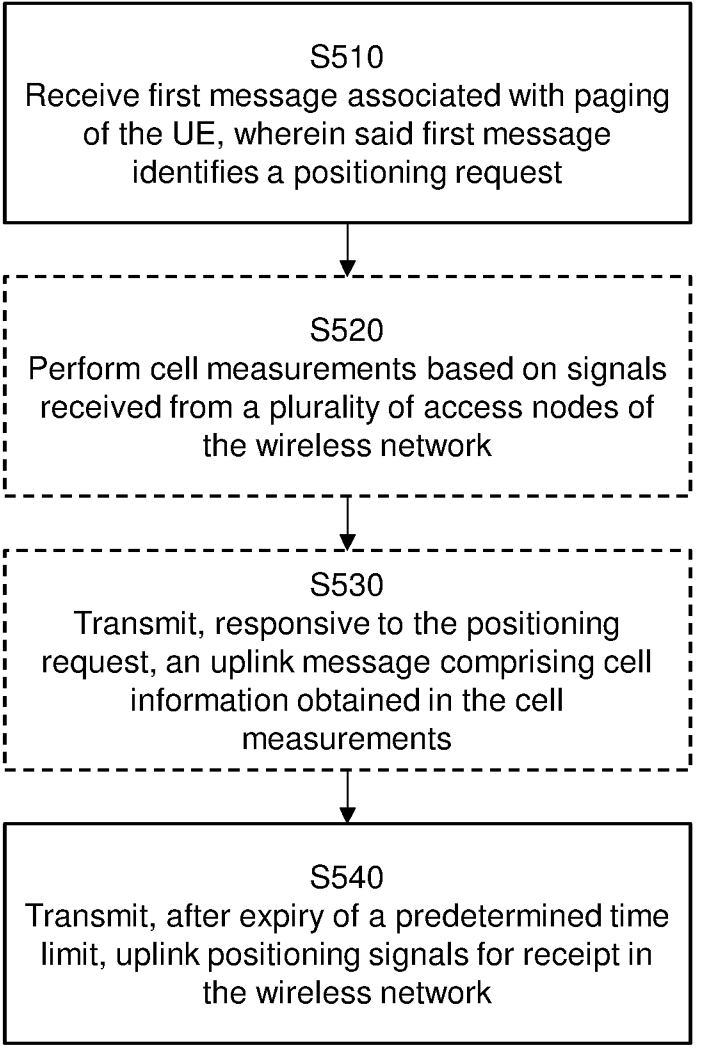
FIG. 5 shows a flow chart of a method carried out by a UE while being unconnected to the wireless network.

FIG. 5 shows a flowchart of a method for facilitating positioning of a UE 10, performed by the UE 10 while being unconnected to a wireless network. The flowchart of FIG. 5 illustrates the general process steps from the perspective of the UE 10 of the proposed solution, which may be further detailed according to the present disclosure. The method comprises receiving S510, from the wireless network 100, a first message associated with paging of the UE, wherein said first message identifies a positioning request; and transmitting S540, after expiry of a predetermined first time limit, uplink positioning signals for reception in the wireless network.

Figure 6:
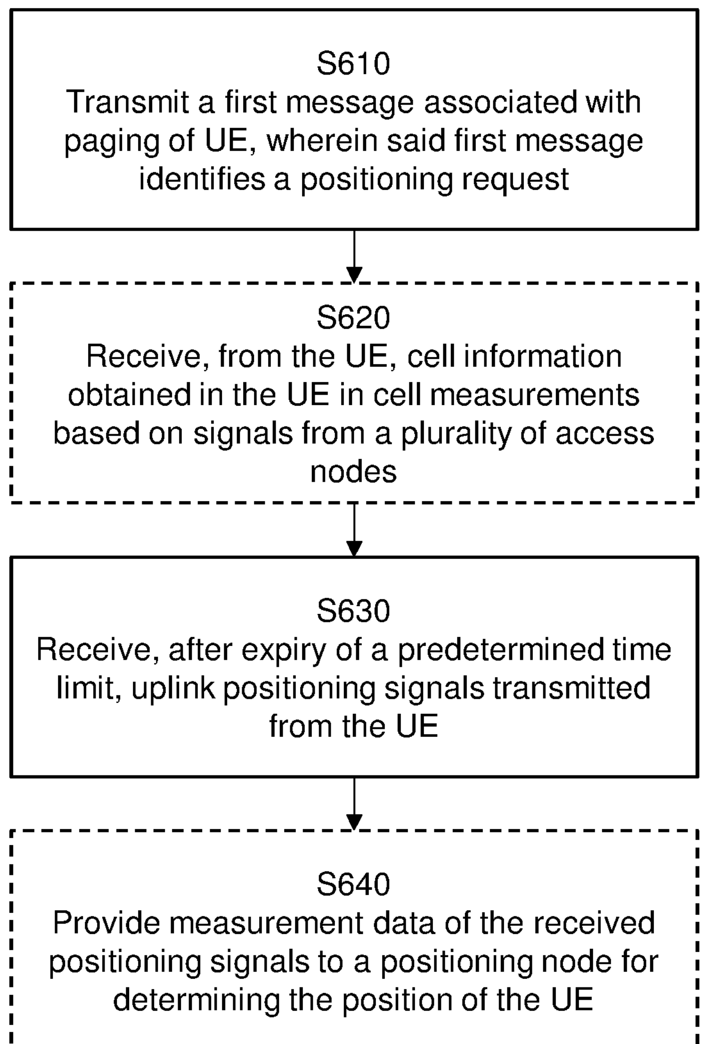
FIG. 6 shows a flow chart of a method carried out by an access node of the wireless network while the UE is unconnected.

FIG. 6 shows a flowchart of a method for facilitating positioning of a UE 10, performed by the access node 121 while the UE is unconnected to the wireless network. The flowchart of FIG. 6 illustrates the general process steps from the perspective of the network of the proposed solution, which may be further detailed according to the present disclosure. The method comprises transmitting 610 a first message associated with paging of the UE 10, wherein said first message identifies a positioning request;

receiving 630, after expiry of a predetermined first time limit, uplink positioning signals transmitted from the UE 10.

The proposed solution thus provides for triggering the UE 10, while being unconnected to the wireless network 100, specifically the access network 120, to transmit UL positioning signals for reception in the access network to perform measurements which can be used for determining a position estimation of the UE 10, e.g. by the LS 130. By configuring the UE 10 to transmit the positioning signals after expiry of the first time limit, it is further possible to configure the timing of when access network 120 shall listen for the UL positioning signals. Unnecessary allocation of e.g. SRS resources before expiry of the first time limit can thus be avoided.

Referring back to FIG. 5, in various examples the UE 10 is triggered to perform S520 cell measurements based on signals received from a plurality of access nodes 121-123 of the wireless network; and transmit S530, responsive to the positioning request, an uplink message comprising cell information obtained in the cell measurements.

With reference to FIG. 6, in various embodiments the access node 121 may be configured to receive, from the UE 10, an uplink message comprising cell information obtained in the UE 10 in cell measurements based on signals from a plurality of access nodes 121-123 of the wireless network.

By including the positioning request already in the association with paging, the UE 10 is thus triggered to make neighbor cell measurements, and report the obtained cell information, during the Random Access (RA) procedure, which may include some Radio Resource Control (RRC) procedure (e.g. Msg3, Msg4). Measurements after RA procedure may also be possible. However, the intention is in some examples to report the obtained cell information right after the RA procedure. Thanks to the transmission of uplink positioning signals being postponed until expiry of the first time limit, the network 100 is provided with time to determine, from the received cell information, relevant cells and/or beams in which positioning signals will be received. As a consequence, resources in other cells or beams need not be allocated for reception of positioning signals, thus saving network resources for other purposes or users.

Various examples will now be described with reference to FIGS. 7-10, which fall under the general concept of FIGS. 5 and 6.

Figure 7:
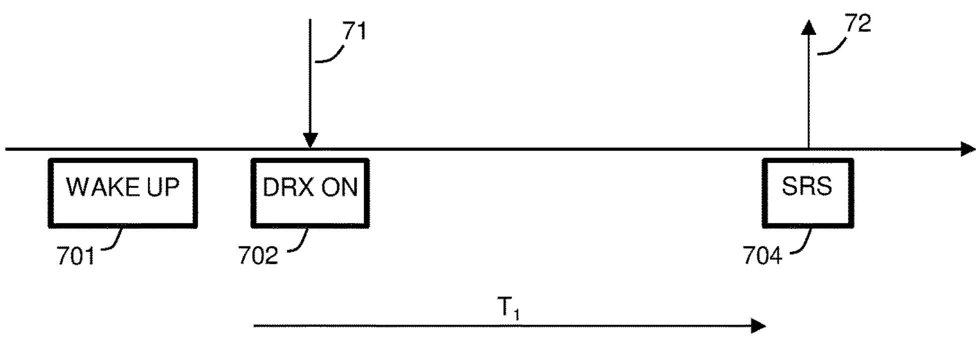
FIG. 7 shows a time diagram for signaling according to a version of the general method.

FIG. 7 schematically discloses an example of the proposed solution. A time window is shown for an SRS resource or an SRS resource-set (if it contains multiple SRS-resources) to be used for UL positioning. The end of the time window identifies a time limit $$T_1.$$

The time limit $$T_1$$

may in various examples be determined based on a reference point, as a minimum time period running from the reference point. This way, the time limit $$T_1$$

can be seen as a timer. In some examples the reference point may be associated with paging initiated by the network 100. Examples will be outlined below where the reference point may be associated with a message received or transmitted in RA, such as in RRC Msg 3. The time limit $$T_1$$

can in different examples be defined by information contained in broadcast system information, or in a previous RRC_CONNECTED state. Alternatively, the time limit $$T_1$$

may be preconfigured by specification and thus known to the UE 10, either as a specified value or as a value selected from a lookup table based on other input associated with the UE configuration, such as a current DRX cycle.

With reference to the example of FIG. 7, the reference point is associated with an on-period of a DRX window 702 in which the UE 10 may expect to receive a paging message. In other words, when paging occurs in a DRX ON period 702, the time limit $$T_1$$

may be determined based on the DRX period 702 in which the paging was initiated. The reference point may be the start or the end of DRX ON, or any predetermined point in time associated with DRX ON.

During the DRX ON period, the UE 10 may receive a paging message 71. In contrast to legacy paging, this type of paging message 71 can be used to identify, by the UE 10, an uplink positioning request. This may in various examples be obtained by the paging request 71 being scrambled with a positioning paging-RNTI. This will implicitly trigger the UE 10 for UL positioning. Furthermore, the paging message may contain an indication of SRS transmission type for positioning, such as one of aperiodic, periodic, semi-persistent SRS, or other.

After expiry of the time limit $$T_1,$$

the UE 10 will, as triggered by the UL positioning of the paging message 71, conduct SRS transmission while all the time maintaining unconnected, e.g. in RRC_IDLE/RRC_INACTIVE. In this context, the UE is expected to perform TX beam-sweeping which include at least the camped cell, with which the RA procedure is carried out. The SRS configuration for TX beam-sweeping operation can be obtained by the UE 10 when the UE 10 is in RRC connected mode.

In various examples, the UE 10 is configured to perform RX beam-sweeping for beam-pair determination, and to report its findings to the access network 120 no later than at the expiry of a time limit, which may be the time limit $$T_1,$$

or an earlier second time limit $$T_2.$$

This may include the following process steps:

a) Neighbor cell measurement by the UE 10, with the objective of identifying the best SSB beam index, or a set of indices of good-quality SSB beams, for each neighbor cell provided by access nodes 121-123. These operations can be started before the reference point, e.g. if the UE 10 is already aware that it may receive paging with positioning indication.

b) An uplink message (not shown in FIG. 7) may be transmitted, comprising cell information obtained in the cell measurements. The message may form part of or be triggered by a Random Access procedure. The uplink message may thus be transmitted as MsgA in a 2-step RACH or Msg3 in a 4-step RACH, wherein the cell information identifies the best or preferred SSB beam or set of SSB beams from the serving cell and selected neighbor cells. As an alternative, the cell information can be transmitted in any uplink message after RACH procedure, preferably, the subsequent uplink transmission right after RACH procedure. For example, the cell information may include cell ID/SSB beam index/beam quality indicator etc. In some examples, the uplink message may further identify a request to receive further information subsequently in the downlink. In this case, the further information to be transmitted subsequently in the downlink may be SRS configuration information, unless the UE 10 is configured to determine those resources.

c) Furthermore, in response to the uplink message, the access node 120 may be configured to indicate UL SRS grant in a subsequent DL message, such as MsgB in a 2-step RACH or Msg4 in a 4-step RACH. As outlined further below, this may include UL SRS configuration of the serving access node and neighboring access nodes.

Figure 8A:
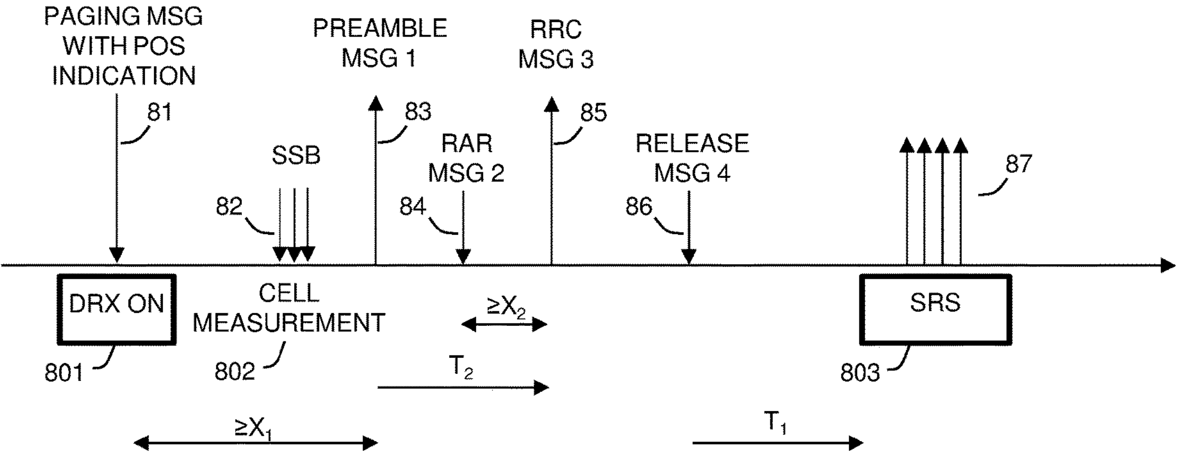
FIG. 8A shows a time diagram for signaling according to a detailed example showing various versions of how to implement the general method in a case of 4 step random access procedure.
Figure 8B:
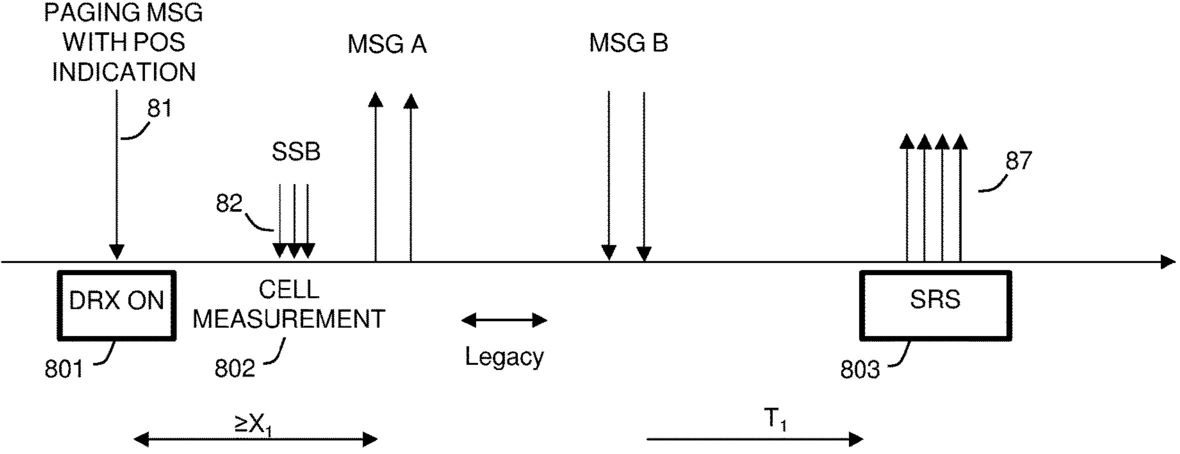
FIG. 8B shows a time diagram for signaling according to a detailed example showing various versions of how to implement the general method in a case of 2 step random access procedure.

FIGS. 8A and 8B illustrates alternative examples, which have most aspects in common with the procedure of FIG. 7. However, in FIGS. 8A and 8B more detailed examples are provided in which neighbor cell measurement and a PRACH procedure have been included. FIG. 8A shows the proposed solution implemented for a 4-step RACH type, whereas FIG. 8B illustrates the solution implemented for 2-step RACH. FIGS. 8A and 8B also provide alternative definitions of the mentioned time limits. It shall be noted that alternatives to the process described with reference to FIG. 8A will be outlined with reference to the signaling diagram of FIG. 10. The description below is predominantly outlined with reference to the examples provided in FIG. 8A, whereas the corresponding arrangement for 2-step RACH are mostly indicated by reference.

During a DRX ON period 801, the UE 10 receives a paging message 81, which identifies a positioning request to transmit UL positioning signals. Responsive to receiving the positioning request, cell measurements 802 are carried out based on signals 82 received from various access nodes 121-123, such as SSBs.

The UE 10 responds with a preamble 83 as RACH Msg1. In some examples, the Msg1 may be configured to contain an acknowledgment of the positioning request. The UE 10 may be previously assigned with specific Msg1 preamble to be used for acknowledgment, at a point when the UE 10 is in RRC connected mode. This way, the access network is made aware that the UE 10 will subsequently report cell information based on cell measurement of signals from neighbor cells.

The access node 120 replies with a RAR Msg2.

The UE 10 reports the cell information in Msg3 (RRC connection request) based on performed cell measurements. As noted, the UE 10 is, in various examples, configured to transmit the cell information prior to expiry of a time limit. As exemplified in FIG. 8, a second time limit $$T_2$$

may be configured for this purpose. The second time limit $$T_2$$

may be determined based on the same reference point as the first time limit $$T_1$$

or from a different reference point, such as one of a point in time associated with the DRX ON period 801 in which the paging message was received, or reception of a DL message, such as the paging message 81 or the RAR Msg2. In some examples the second time limit $$T_2$$

is configured to expire prior to a next paging occasion, e.g. equal to or determined based on the DRX period. The application of the second time limit $$T_2$$

provides the benefit of ensuring that the access network will safely receive the compiled cell information based on cell measurements, whereby allocation of resources for reception of positioning signals 87 can be suitably limited to the cells and beams the UE 10 will transmit to.

The access node 121 subsequently transmits a DL Msg4 (or MsgB in 2-step RACH) which may conclude the RA and RRC procedure. Based on receiving the cell information, the network is configured to release the UE 10 by the transmission of Msg4, without proceeding to RRC_CONNECTED.

After expiry of the first time limit $$T_1$$

the UE 10 will transmit uplink positioning signals 72, 87. While the example illustrated in FIG. 7 showed the first time limit to be determined based on DRX ON, the example of FIGS. 8A and 8B provide for an alternative definition of the reference point to determine $$T_1.$$

Here, the reference point is determined based on reception of DL Msg4 from the access node 121. As yet another alternative, the reference point may be determined based on reception of another DL message, such as the paging message 81 or the RAR Msg2. In the context of 2-step RACH, the reference point may be determined based on reception of MsgB. In yet another example, the reference point to determine $$T_1$$

is based on transmission of an UL message from the UE 10, such as the uplink message, e.g. Msg3, comprising the cell information obtained based on the performed cell measurements. In the context of 2-step RACH, the reference point may be determined based on transmission of MsgA.

While transmission of uplink positioning signals may be carried out within allocated SRS resources by performing SRS transmissions using a full beam-sweep, such a solution may require overly many SRS resources. In various examples, the UE 10 is configured with knowledge of the SRS resources to be used in order to ensure that SRS transmissions 72, 87 reach an intended serving/neighboring base station 121-123. Such knowledge is enabled by means of the neighbor cell measurement 802 and reporting 85 as outlined above. To facilitate this, there is, in various examples, an association between SSB resources of the serving/neighboring base stations 121-123 and corresponding UL SRS resources, e.g. a mapping from SSB beam indices to UL SRS resources. This SSB-to-UL SRS association information is considered to be part of UL SRS configuration.

The SRS configuration information may contain information on the SRS configuration on the serving cell, and it also contains a list of the relevant neighbor cells and beams where the UE 10 should transmit SRS. In one example, a simple rule for mapping SSB beam indices to SRS resources is pre-configured. This pre-configuration may be carried out when the UE 10 is in RRC_CONNECTED, or via System information or fixed specified and mandated by specification. Pre-configuration may also contain the preamble index that can be used for positioning purpose. The UE 10 uses this preamble index in response to the positioning request.

In one example, each access node provides the SSB and UL SRS resource association of the UL SRS configuration to the LS 112. LS provides this information to the UE 10 via LPP protocol. Alternatively, the access node(s) provides this information to the UE 10 via higher layer signaling (RRC message or SIB). With the former method or with RRC messages, the signaling happens when the UE 10 is in RRC_CONNECTED, or when the UE 10 is in RRC_IDLE/RRC_INACTIVE via Msg4/MsgB as indicated above. With the latter method on SIB, the UE 10 can read the information from a SIB while in RRC_IDLE/RRC_INACTIVE. Both methods are thus complementary.

The mapping of SSB to UL SRS can be one-to-one mapping or many-to-one mapping (e.g. N SSBs are mapped to a single UL SRS resource) or one-to-many mapping (e.g. a single SSBs are mapped to N UL SRS resources).

Figure 9:
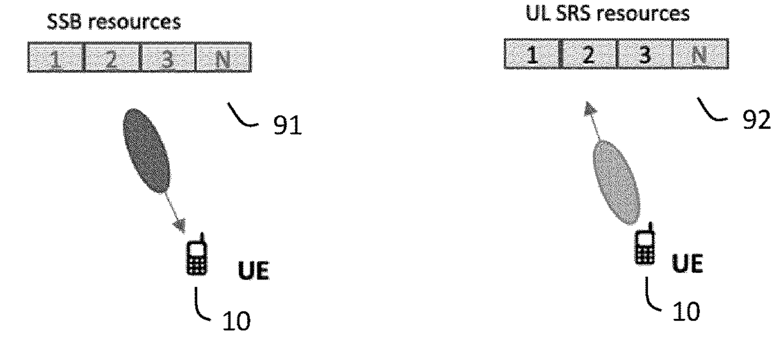
FIG. 9 illustrates a process for determining UL resources for transmission of positioning signals based on received signals, according to various examples.

FIG. 9 schematically illustrates the mapping of SSB resources 91 to UL SRS resources 92 according to an example. During neighbor cell measurement 802, the UE identifies the best SSB beam, e.g. the SSB beam with index 2, for a cell associated with a certain access node. As for the subsequent UL SRS transmission 72, 87, the UE has to transmit UL SRS to that cell in a UL SRS resource that corresponds to the detected SSB index 2. According to the proposed solution above, the UE 10 is pre-configured to either know the corresponding UL SRS resource, or to determine, for each cell, the UL SRS resource 92 for transmitting the positioning signals by mapping from corresponding SSB resources 91 in which signals were received from that cell.

Figure 10:
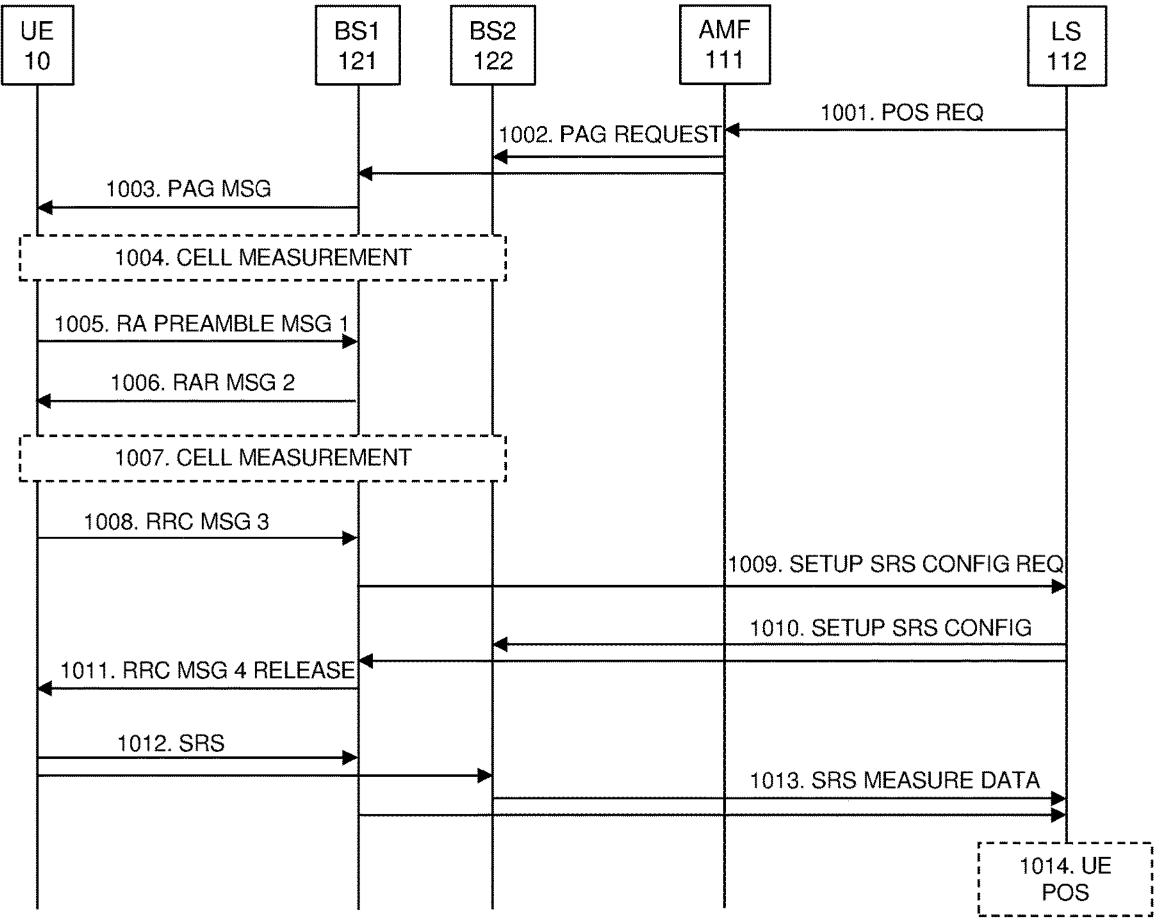
FIG. 10 shows a signaling diagram of an exemplary procedure, with variants, to perform uplink-based positioning of a UE in idle mode.

FIG. 10 shows a signaling diagram, outlining various steps of different examples of the proposed solution. The steps provided in FIG. 10 are consistent with the method outlined with reference to FIGS. 7 and 8A, although with different or additional levels of detail and alternatives. Such details and alternatives are however also applicable to the examples described with reference to FIGS. 7 and 8A, unless contradictory.

At an initial stage, the network 100 triggers a paging request message to the RAN 120. This may involve a request 1001 for UE location being provided by the LS 112 to the AMF 111. The AMF 111 may thereby be triggered to provide a paging request 1002 to the RAN 120, here illustrated by access nodes 121 and 122, which paging request 1002 may be provided by a paging cause "uplink SRS", which may include a sub cause value "3GPP RAT" or "other method".

Based on the paging cause value, the RAN 120 includes extra information in the page message 1003, to be decoded by the UE 10, wherein the extra information identifies a positioning request. In an alternative example, the extra information identifying a positioning request is not included until Msg2, as outlined below.

Responsive to identification of the positioning request in the paging message 1003, the UE 10 performs neighbor cell/beam measurement 1004 to identify suitable downlink SSB/beams from different base stations 121, 122 to be used for UL SRS transmission. Alternatively, if the UE 10 has already performed neighbor cell/beam measurement within a predetermined time prior to decoding the positioning request, additional cell measurement may be dispensed with.

The UE 10 concludes that there is a certain amount of time available between the paging from the access node 121 and the sending 1005 of the RA preamble by the UE to perform such measurements. This amount of time can be configured by the network, e.g., in system information, or when UE 10 was in RRC_CONNECTED. Alternatively, the amount of time may be fixed in a standard specification. The time available before RA preamble transmission 1005 in Msg1 may be dependent on the paging message comprising the positioning request. As an example, the UE 10 may thus be required, by the standard specification, to start transmission of the RA preamble no earlier than $$X_1$$

ms after being paged 1003 with cause UL-SRS transmission, where $$X_1$$

is selected to be enough to perform a number of neighbor cell measurements. Alternatively, the UE 10 may thus be required to start transmission of the RA preamble in the first RA preamble transmission window after the paging reception.

The UE 10 responds 1005 to the access node 121 with a RA preamble 83. The response 1005 may in some examples comprise extra information: if the page 1003 included the indication of an UL positioning request, then Msg1 1005 serves as an acknowledgement of the positioning request, i.e., accept task, for which contention is solved based on subsequent Msg 3. The aforementioned extra information can also be in a form of implicit information, such as based on the selected RA preamble for positioning.

The access node 121 transmits Msg2 1006. This message may be according to legacy systems. In some examples there may be one piece of extra information: if the paging message 1003 did not include the indication of an UL positioning request, such as cause "UL-SRS transmission" i.e. legacy paging, the indication of an UL positioning request may alternatively be included in Msg2 1006, such as paging cause "UL-SRS transmission". In at least the event that the indication of an UL positioning request is provided in Msg2 1006, a sufficient time gap $$X_2$$

must be provided between Msg2 and transmission of RRC Msg3 by the UE 10 for cell measurements 1007. That time gap may be configured in the corresponding manner of any of the examples provided above with respect to amount of time $$X_1$$

for cell measurement 1004.

The UE 10 transmits Msg3 1008. This message is configured to include cell information based on the cell measurements 1004, 1007, such as preferred beams, Quality index etc. Msg3 1008 may further comprise an "accept task" information, if not done in Msg1 1005, in particular in case the UL positioning request was conveyed in Msg2 1006. In some examples, the UE 10 is configured to transmit the cell information report provided in Msg3 no later than at the expiry of a time limit, such as the mentioned second time limit $$T_2.$$

Based on the cell information received from the UE 10, the serving access node 121 informs the LS 112 about suitable beams to be used for UL SRS, e.g. in a Setup SRS config request 1009.

The LS 112 configures relevant access nodes 121, 122 to monitor UL SRS resources by SRS configuration. The relevant access nodes 121, 122 may be determined based on the cell information received from the UE 10.

The UE 10 is released by reception of Msg4 1011. In some examples this may include activation and configuration of SRS for UL SRS which are the corresponding UL cells and/or beams to the DL cells and/or beams reported in Msg3. It shall be noted, though, that this configuration may be provided to or determined in the UE 10 before or in parallel to the SRS config steps 1009, 1010, as long as suitable SRS resources are configured at the UE 10 and the relevant access nodes 121, 122 before UL-SRS transmissions. In order to reduce the latency, step 1009, 1010 can also be performed locally between BS1 121 and BS2 122 (e.g. without LS 112 involvement). As another alternative, step 1009, 1010 can also be performed after step 1011. In this context, the UE 10 is expected to receive downlink information which contain the SRS configuration. The reception of this downlink information can be served as the reference for the time limit $T_1$.

The UE 10 starts to transmit 1012 UL SRS, after expiry of the time limit $T_1$.

At this stage, access nodes that have not been reported as relevant based on the cell information may free up the allocated SRS resources for other purposes.

The access nodes 121, 122 that receive SRS in allocated resources carry out legacy measurement, and reports to the LS 112.

The LS 112 determines 1014 a position of the UE 10 based on the SRS measurements made by the access nodes 121, 122.

It may be noted that the steps described above and shown in FIG. 10 provide two alternative procedures: a first one starting with paging enhanced with the paging cause "UL-SRS transmission," and a second one starting with a legacy page and the paging cause "UL-SRS transmission" provided in Msg2. Moreover, the process steps outlined above may alternatively be applied to a 2 step RACH procedure.

In some examples, the UE 10 is configured to perform the disclosed method of idle mode positioning responsive to, and in some examples dependent on, the UE 10 still camping on a previous serving cell, or on one of a subgroup of configured cells. In practice, it could be the cells within a certain area (e.g. within an industrial factory area). The subgroup of configured cells may for example comprise the previous serving cell and several neighbor cells. The UE 10 may receive the list of cells as part of the aforementioned subgroup of configured cells when the UE 10 is in RRC connected mode (via higher layer protocol signaling (e.g. LPP protocol)). Another example may be cells within a determined area, such as a portion of a paging area. In such examples, if the UE 10 receives paging (or Msg2) with positioning request but the UE 10 has moved to a cell not included in the configured set, the UE 10 should perform positioning according to a fallback option, such as according to the legacy by moving to connected mode.

In various examples outlined above, the UE 10 may thus receive information from the wireless network while the UE 10 is in connected mode, for subsequent use in the proposed method for facilitating positioning while the UE 10 is unconnected, e.g. RRC_IDLE or RRC_INACTIVE. This information may include one or more parameters or sets of parameters. One example of such a set of parameters may comprise configuration of positioning signals for UL transmission, such as SRS configuration. This set of parameters may include SRS for Tx beam sweeping, and mapping with SSB, for one or more cells. Another example of parameters is an identification of a selected preamble for the UE to use in response to a paging message identifying a positioning request. Yet another example of such parameters is an identification of a list of supported cells, to which positioning signals may be transmitted while the UE is unconnected.

Various details of the proposed solution and examples have been described above. The solution provides the possibility of performing UE location in a power and resource efficient manner, and with low latency. The proposed solution is defined by the terms of the appended claims.

The invention claimed is:

1. A method for facilitating positioning of a user equipment (UE) performed by the UE while being unconnected to a wireless network, the method comprising:

receiving, from the wireless network while being unconnected to the wireless network, a first message associated with paging of the UE, wherein said first message identifies a positioning request to transmit uplink positioning signals and a Sounding Reference Signal (SRS) transmission type for positioning;

transmitting, after expiry of a predetermined first time limit, uplink positioning signals for reception in the wireless network; and conducting SRS transmission, after expiry of the predetermined first time limit, while maintaining being unconnected to the wireless network.

2. The method of claim 1, wherein said first message is a paging message.

3. The method of claim 1, wherein said first message is a downlink random access response received after a paging message.

4. The method of claim 1, wherein said first time limit defines a minimum time period running from a reference point associated with said paging.

5. The method of claim 4, wherein said reference point is associated with an on-period for discontinuous reception in which the paging was initiated.

6. The method of claim 4, wherein said reference point is associated with a downlink message received after the paging.

7. The method of claim 4, wherein said reference point is associated with an uplink message transmitted after the paging.

8. The method of claim 1, comprising: performing cell measurements based on signals received from a plurality of access nodes of the wireless network; transmitting, responsive to the positioning request, an uplink message comprising cell information obtained in the cell measurements.

9. The method of claim 8, wherein the uplink positioning signals are transmitted in resources associated with said cell information.

10. The method of claim 8, comprising: receiving, responsive to the uplink message comprising cell information, a downlink random access message without proceeding to connected state.

11. The method of claim 8, comprising: determining, for each cell of said cell information, resources for transmitting the positioning signals by mapping from corresponding resources in which said signals were received.

12. The method of claim 8, comprising: receiving, from the wireless network, configuration of resources for transmitting the positioning signals.

13. The method of claim 8, wherein the uplink message comprising cell information is transmitted at or before expiry of a predetermined second time limit.

14. The method of claim 13, wherein the second time limit is configured to expire prior to a next paging occasion.

15. The method of claim 1, wherein the step of transmitting uplink positioning signals after expiry of said predetermined first time limit is carried out responsive to said first message being received from one of: a last serving cell; or a cell having a subgroup association in common with the last serving cell.

16. The method of claim 1, comprising: receiving during connected mode, from the wireless network, information identifying at least one of: positioning signal configuration; a selected preamble for use by the UE; a list of supported cells.

17. A user equipment (UE) configured for operation with a wireless network, said UE comprising: a wireless transceiver; logic configured to control the wireless transceiver to facilitate positioning of the UE while being unconnected to the wireless network, including to:

receive, from the wireless network while being unconnected to the wireless network, a first message associated with paging of the UE, wherein said first message identifies a positioning request and a Sounding Reference Signal (SRS) transmission type for positioning; and transmit, after expiry of a predetermined first time limit, uplink positioning signals for reception in the wireless network; and conduct SRS transmission, after expiry of the predetermined first time limit, while maintaining being unconnected to the wireless network.

18. A method for facilitating positioning of a user equipment (UE) performed in a network node of wireless network while the UE is unconnected, the method comprising:

transmitting a first message associated with paging of the UE, wherein said first message identifies a positioning request to transmit uplink positioning signals and a Sounding Reference Signal (SRS) transmission type for positioning;

receiving, from the UE while the UE is unconnected, cell information obtained in the UE in cell measurements based on signals from a plurality of access nodes;

receiving, after expiry of a predetermined first time limit, uplink positioning signals transmitted from the UE; and transmitting measurement data of the received positioning signals to a positioning node for determining a position of the UE.

19. The method of claim 18, wherein said first message is a paging message.

20. The method of claim 18, wherein said first message is a downlink random access response transmitted after a paging message.

* * * * *